United States Patent
Lesel

(10) Patent No.: US 11,670,767 B2
(45) Date of Patent: Jun. 6, 2023

(54) NANOSTRUCTURED INORGANIC ELECTRODE MATERIALS WITH FUNCTIONALIZED SURFACES

(71) Applicant: NANODIAN, Los Angeles, CA (US)

(72) Inventor: Benjamin Kalman Lesel, Los Angeles, CA (US)

(*) Notice: Subject to any disclaimer, the term of this patent is extended or adjusted under 35 U.S.C. 154(b) by 260 days.

(21) Appl. No.: 16/699,725

(22) Filed: Dec. 1, 2019

(65) Prior Publication Data

US 2020/0176769 A1 Jun. 4, 2020

Related U.S. Application Data

(60) Provisional application No. 62/774,205, filed on Dec. 1, 2018.

(51) Int. Cl.
| | |
|---|---|
| *H01M 4/505* | (2010.01) |
| *H01M 10/0525* | (2010.01) |
| *C01G 45/12* | (2006.01) |
| *H01M 4/02* | (2006.01) |
| *B82Y 30/00* | (2011.01) |

(52) U.S. Cl.
CPC ........ *H01M 4/505* (2013.01); *C01G 45/1242* (2013.01); *H01M 10/0525* (2013.01); *B82Y 30/00* (2013.01); *C01P 2002/85* (2013.01); *C01P 2004/64* (2013.01); *C01P 2006/40* (2013.01); *H01M 2004/028* (2013.01); *Y10S 977/773* (2013.01); *Y10S 977/948* (2013.01)

(58) Field of Classification Search
CPC .............. H01M 4/131; H01M 4/1391; H01M 10/0525; H01M 2004/028; H01M 4/505; Y10S 977/948; C01G 45/1242
See application file for complete search history.

(56) References Cited

U.S. PATENT DOCUMENTS

| | | | | |
|---|---|---|---|---|
| 6,183,718 | B1* | 2/2001 | Barker | H01M 4/131 |
| | | | | 423/599 |
| 6,468,695 | B1* | 10/2002 | Barker | C01G 45/1242 |
| | | | | 429/231.1 |
| 2015/0263337 | A1* | 9/2015 | Naoi | H01M 4/1391 |
| | | | | 429/231.1 |

* cited by examiner

*Primary Examiner* — Khanh T Nguyen
(74) *Attorney, Agent, or Firm* — Merle W. Richman, III

(57) ABSTRACT

Embodiments of inorganic electrode materials that utilize nanostructure surface modifications via functionalization via carbonate/carboxylate to achieve superior electrochemical performance and methods of producing same.

20 Claims, 4 Drawing Sheets

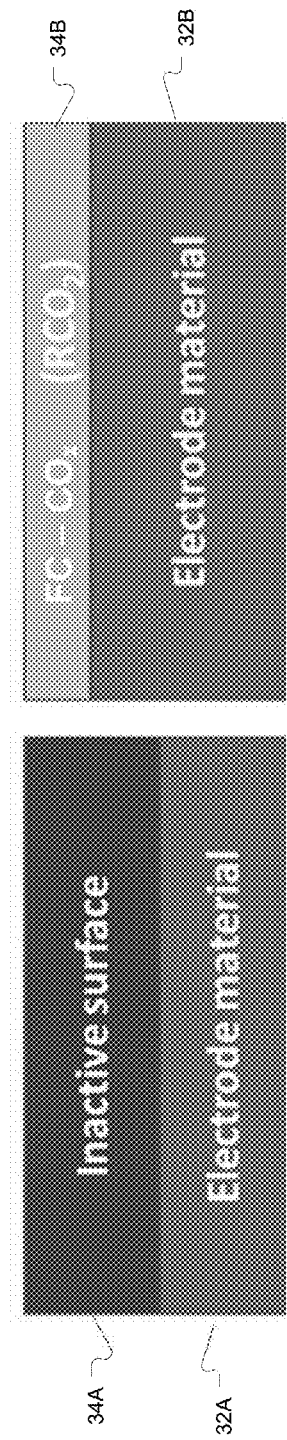

NANOSTRUCTURED INORGANIC ELECTRODE MATERIALS WITH FUNCTIONALIZED SURFACES

TECHNICAL FIELD

This disclosure generally relates to nanostructured inorganic electrode materials including Li-ion electrode materials.

BACKGROUND

Some nanostructured electrode materials with small crystallite sizes (less than about 50 nm) may allow for greatly improved charge storage times and cycle life-times over their bulk counter-parts. Unfortunately, many inorganic electrode materials including Li-ion electrode materials have electrochemically inactive surfaces, a characteristic that is overexpressed in such high surface area nanostructured materials. As a result, nanostructured inorganic electrode materials may have lower capacity then their bulk counterparts. The negative characteristics of the inactive inorganic electrode material surface may be reduced by functionalization, in an embodiment with carbon-oxide based capping groups. Inorganic electrode material carbon-oxide based functionalization may prevent or limit surface rearrangement on inorganic electrode materials thereby increasing their storage capacity and life.

BRIEF EXPLANATIONS OF THE DRAWINGS

FIG. 3A is a simplified diagram of inactive surface such as oxide formed on an electrode material such as $LiMn_2O_4$ according to various embodiments.

FIG. 3B is a simplified diagram of a functionalized carbon-oxide layer such as $RCO_2$ formed on an electrode material such as $LiMn_2O_4$ according to various embodiments.

FIG. 4A is a simplified X-ray photoelectron spectroscopy (XPS) image of the C 1s binding energy for the functionalized carbon-oxide modified nano-$LiMn_2O_4$ with normal carbon contamination, and carbonate according to various embodiments.

DETAILED DESCRIPTION

This disclosure relates to inorganic electrode materials which utilize nanostructure and surface modification (functionalization in an embodiment) to achieve superior electrochemical performance.

Inorganic material surfaces including metal oxide surfaces may strongly interact with carbon-oxide based functional groups in dissolved organic materials. In an embodiment, when these inorganic/organic hybrid materials are dried and heated, the majority of the organic portion combusts before 600° C., while carbon-oxide based functional groups such as carbonates can remain affixed to the inorganic material surface until about 700° C. Functionalized carbon-oxide groups may enable significant inorganic material surface resistance to unwanted chemical reactions and may further provide resistance to surface rearrangement during formation of inorganic materials including metal oxides. In an embodiment, the functionalization of inorganic materials including metal oxide surfaces via functionalized carbon-oxide groups for use in nanomaterials may reduce the increased risk of erosion, dissolving, and unwanted surface rearrangements and side reactions common in high density surface areas.

In an embodiment, electrode functionalization via carbon-oxide groups are applied to Li-ion materials in lithium ion batteries. In an embodiment, nanostructure Li-ion materials may be employed in batteries due to their ability to resist degradation from repeated electrochemical insertion and extraction of lithium ions, which may lead to greatly improved cycle lifetimes. Additionally, such an embodiment, may enable far greater ionic mobility through their open structures thus improving charge time and the power level of the resulting batteries. It is noted, however that many inorganic electrode materials have either unstable, reactive and/or electrochemically inactive surfaces which may become ever more problematic when the surface area is increased in nanostructured inorganic electrode materials.

In addition, some inorganic electrode materials may be subject to surface effects that negatively affect their mass normalized capacity. $MoO2$ for example has a surface layer of inactive $MoO3$ that may form upon exposure to oxygen at ambient conditions. $LiNi0.8Co0.15Al0.05O2$ may form a surface layer of $Li2CO3$ upon exposure to atmospheric $CO2$. $LiMn2O4$ may have an electrochemically inactive $Mn3O4$ surface rearrangement that naturally forms due to the instability of the Li+ in spinel surface sites and others. Additionally, nearly all inorganic electrode materials surfaces may react with electrolytes, which cover their surface, which may lead to poor internal resistance, poor coulombic efficiency (such as in Si-based anodes), and in other cases lead to degradation of the inorganic material surface (such as in Mn2+ dissolution in $LiMn2O4$). In an embodiment, surface functionalization via carbon-oxide groups may help reduce surface reactions and even prevent surface rearrangements.

Figure 1:
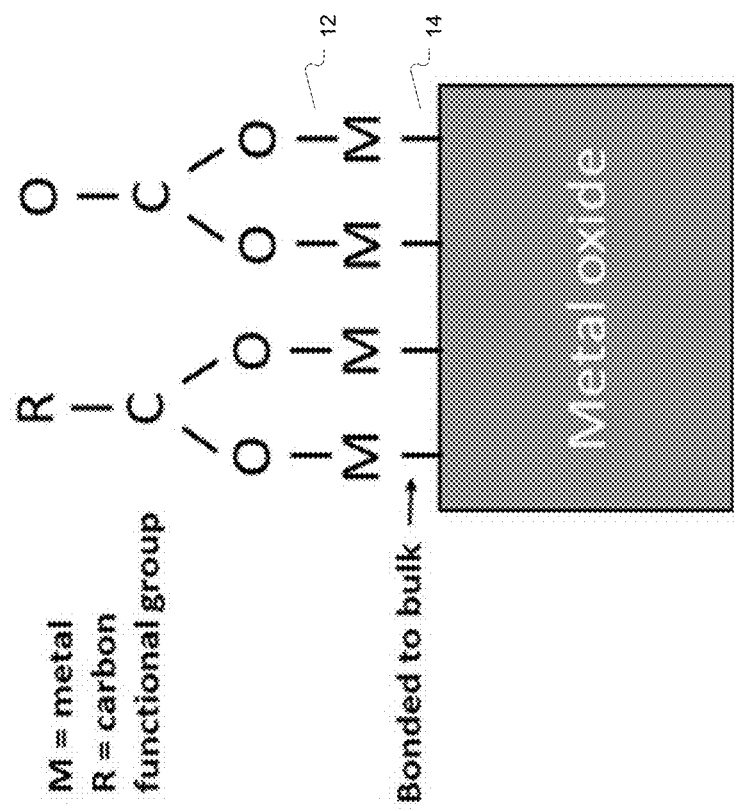
FIG. 1 is a simplified diagram of functionalized carbon-oxide groups bound to inorganic metal-oxide material according to various embodiments.

As shown in FIG. 1 in an embodiment, carbon-oixde groups may bond to inorganic material surface such as metal-oxide materials 10 generally through bidentate or bridging complexes and form M-OC (M=metal) bonds 12 where the metal is also bonded ionically to the bulk structure below 14.

Figure 2:
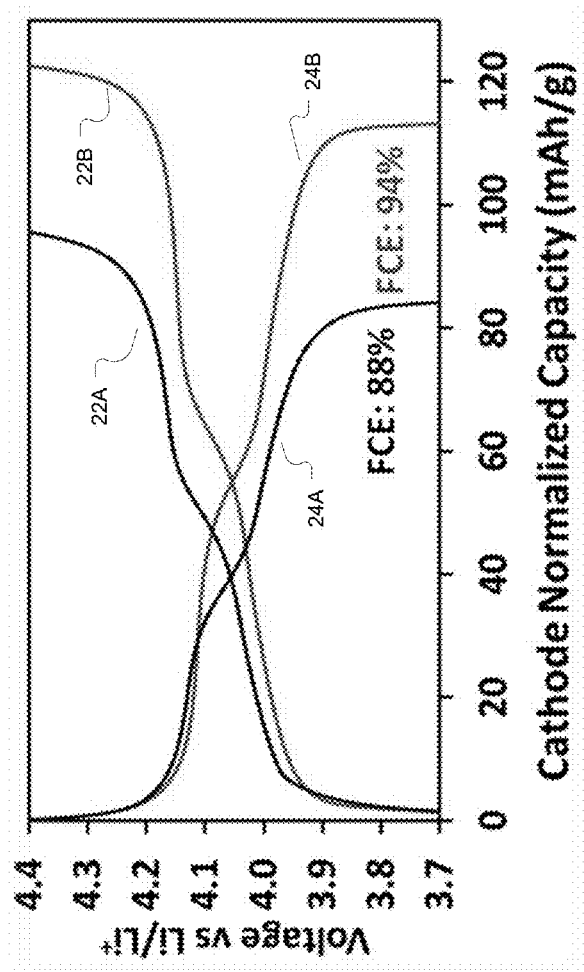
FIG. 2 is a diagram of first cycle charge/discharge curves of nanostructured $LiMn_2O_4$ without surface functionalization and first cycle charge/discharge curves of nanostructured $LiMn_2O_4$ with surface functionalization via functionalized carbon-oxide groups according to various embodiments.

In an embodiment, surface modification via functionalization of carbon-oxide groups may be employed in lithium ion battery systems. In an embodiment of a lithium ion battery, nanostructured $LiMn2O4$ may be employed. Nanostructured $LiMn2O4$, however may have an electrochemically inert surface rearrangement problem as well as a proclivity to dissolve in common electrolyte solutions. FIG. 2 is a diagram 20 of first cycle charge/discharge curves 22A, 24A of nanostructured $LiMn2O4$ without surface functionalization and first cycle charge/discharge curves 22A, 24A of nanostructured $LiMn2O4$ with surface functionalization via carbon-oxide groups.

As shown in FIG. 2, the $LiMn2O4$ having a surface functionalized with carbon-oxide groups has far greater capacity than $LiMn2O4$ without functionalization. In an embodiment, the increase in capacity is due in part to the surface functionalized with carbon-oxide groups preventing inactive surface formations during synthesis. The protective carbon-oxide functional group may be attached to Mn during crystallization of the LiMn2O4 which may prevent the formation of inactive surface oxide 34A (similar in structure to Mn3O4), which may naturally form on LiMn2O4 32A, as depicted in FIG. 3A and FIG. 3B. In FIG. 3B, the functionalized carbon-oxide group (RCO2) 34A layer is formed on the surface of the inorganic electrode material 32B in an embodiment 30B. In an embodiment the carbon-oxide functional layer formed on the on LiMn2O4 surface may increase first cycle efficiency (FCE) compared to LiMn2O4 without carbon-oxide functionalization (added to the surface). This improvement may occur because functionalized carbon-oxide is less reactive to the carbonate electrolytes and thus a functionalized electrode may be more efficient.

Figure 4B:
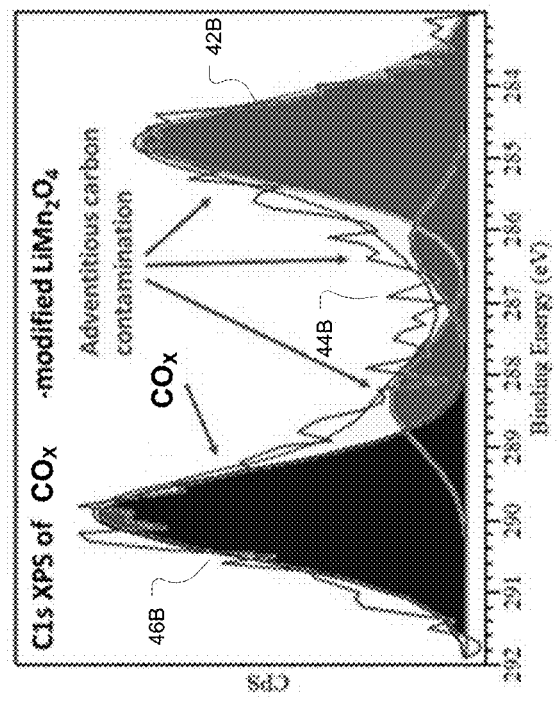
FIG. 4A is a simplified X-ray photoelectron spectroscopy (XPS) image of the C 1s binding energy for normal nano-$LiMn_2O_4$ with nominal carbon contamination according to various embodiments.
Figure 4A:
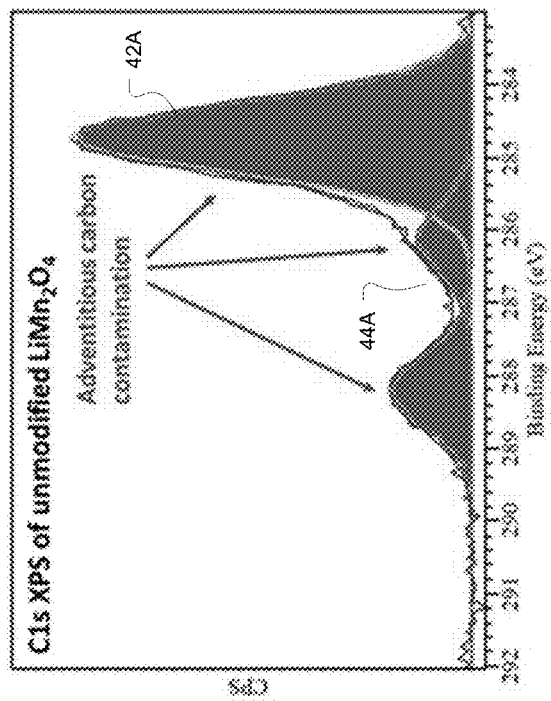

FIG. 4A is a X-ray photoelectron spectroscopy (XPS) image 40A of the C is binding energy for normal nano-LiMn2O4 42A with nominal carbon contamination 44A. FIG. 4B is a X-ray photoelectron spectroscopy (XPS) image 40B of the C is binding energy for the functionalized carbon-oxide modified nano-LiMn2O4 42B with normal carbon contamination 44B, and functionalized carbon-oxide 46B. It is noted that XPS is a surface sensitive technique that only detects a few nanometers into a materials surface. Accordingly, XPS is able to observe the functionalized carbon-oxide surface modification in FIG. 2B, which is clearly visible in the modified nano-LiMn2O4 42B and absent in the unmodified version 42A shown in FIG. 4A.

As noted, in an embodiment, functionalized carbon-oxide may be bound in a bidentate manner to surface metals of the nanomaterial. In another embodiment, functionalized carbon-oxide bridges may form between multiple metals.

In an embodiment, a method for functionalizing a nanomaterial via carbon-oxide gro to produce a carbon-oxide-group-modified nano-material may include: (1) preparing a precursor material containing an inorganic part and an organic part containing a polymer with carbon-oxide group functionality; and (2) heating the preparation to remove organics while leaving behind the carbon-oxide group to produce the desired surface-modified nanomaterial.

In another embodiment, the precursor material is an inorganic nanostructured precursor that is mixed with an organic carbon-oxide group containing polymer. The resultant combination may be further mixed with additional lithium or other salts in an embodiment. Then the combination may be heated to produce a carbon-oxide group-modified nanostructure.

In an embodiment, the inorganic and organic containing precursor materials may have metals tuned to a particular oxidation state (depending on the metal) to assist with carbon-oxide group coordination. This consideration may be evoked by adjusting precursor pH during solution processing. In an embodiment, a precursor material may have water in its structure, which may aid in separation of polymers from carbon-oxide-group-metal bonds.

In an embodiment, the precursor material may be heated under slow air flow to help carefully combust organic materials while maintaining the carbon-oxide group portions being bonded to inorganic portions of the resulting material. In an embodiment, a precursor may be heated from about room temperature to up to about 300-1000° C. with a ramp rate of about 1-10° C./min.

In an embodiment, the resulting carbon-oxide group surface-modified nanostructured material (functionalized nano-structured material) may have a crystallite size of about 6 to about 50 nm calculated as determined by the Scherrer equation applied to the resulting materials X-ray diffraction pattern (XRD). In an embodiment, the shape of the resulting carbon-oxide group surface-modified nanostructures may vary from round particles, interconnected porous networks, wires, and others. In an embodiment, the particle size, wall thickness or general dimensions of the resulting carbon-oxide group surface-modified nanostructured material may between about 10 and about 100 nm, between about 20 and about 200 nm, between about 30 and about 300 nm, between about 40 and 400 nm, and between about 50 and 500 nm.

The various carbon-oxide group surface-modified nanostructured materials may be used as an active electrode material for a variety of batteries and other energy storage devices including LiMn2O4 in an embodiment.

A functionalized LiMn2O4 may be generated according to an embodiment of the invention. An inorganic and organic precursor material as described in a co-pending patent application, which is incorporated by reference may be prepared by dissolving lithium and manganese salts with organic monomers with aqueous solution of pH 3-4. The resultant mixture may be heated to form a viscous gel. The resultant viscous gel contains polymers bonded to metals in part through the carbon-oxide functional groups. The viscous gel may then be transferred to a steel tray and heated in a kiln from room temperature to about 500-900° C. using a ramp of about 30-300° C. per hour with the kiln vent hole open and cross breeze from a fan passing over the opening in an embodiment. During the heating of the gel, O2 from the air may combust with the organic portions of the precursor material during crystallization of the inorganic LiMn2O4 leading to a structural formation that retains the carbon-oxide group bonds at the surface, effectively functionalizing the inorganic LiMn2O4 surface. The retained carbon-oxide group bonds may affect the crystallization of the LiMn2O4 surface such that an electrochemically active near-surface structure (that may be similar to the bulk in an embodiment) may be formed rather than the typical, undesirable inactive Mn3O4 near-surface orientation.

In an embodiment, the resulting powder from the heated gel may be LiMn2O4 with a crystallite size between about 6-50 nm, a nano-sized porosity, and a surface area between about 1 and about 60 m2/g, An XPS of the LiMn2O4 may show the presence of a carbon-oxide group in the C is spectra as shown in FIG. 4B. In an embodiment, the powder may be used as an active cathode material in lithium ion battery electrode. The resultant cathode may be assembled into an electrochemical cell and tested electrochemically to determine its capacity and performance characteristics against a number of anodes including lithium metal, graphite, Si-carbon, LTO, activated carbon. It may also be test against other anode materials with a polymeric separator and using about 1M LiPF6 in about 1:1:1 ethylene carbon (EC):dimethyl carbonate (DMC):ethylmethl carbonate (EMC) electrolyte (or other electrolyte) and additives.

In an embodiment, a cell with the resultant cathode may have a normalized capacity up to between about 100 mAh/g to about 140 mAh/g and may be charged and discharged reversibly without significant Mn loss or degradation due to the nanostructure functionalization. Additionally, in an embodiment, the carbon-oxide group functionality may reduce the reaction with electrolyte, leading to improved first cycle efficiency and prolonged high coulombic efficiency.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A structure including:
   a metal oxide material having a surface and a bulk; and
   functionalized carbon-oxide bound to the surface of the metal oxide material,
   wherein the functionalized carbon-oxide bound to the metal oxide material forms an active surface similar to its bulk.

2. The structure of claim 1, wherein the functionalized carbon-oxide is a functionalized carbon-dioxide.

3. The structure of claim 2, wherein the bound functionalized carbon-oxide increases electrochemically active surface formations during synthesis of the structure.

4. The structure of claim 1, wherein the functionalized carbon-oxide has the structure $R-C-O_2$; where R includes one of H, O, an organic structure, and a non-metal element.

5. The structure of claim 4, wherein the functionalized carbon-oxide is bound to a metal on the surface of the metal oxide material and the functionalized carbon-oxide bound to the metal oxide material reduces inactive surface formations during synthesis of the structure.

6. The structure of claim 1, wherein the structure is a nano-structure having a crystal size between 5 to 50 nm.

7. The structure of claim 6, wherein the structure is an electrode of an electrochemical storage device and the functionalized carbon-oxide bound to the metal oxide material reduces inactive surface formations during synthesis of the structure.

8. The structure of claim 5, wherein the metal oxide material includes Li-ion.

9. The structure of claim 6, wherein the metal oxide material includes $LiMn_2O_4$.

10. The structure of claim 9, wherein the functionalized carbon-oxide has the form $R-C-O_2$; where R includes one of H, O, an organic structure, and a non-metal element.

11. A nano-structure electrode of an electrochemical storage device including:
    a metal oxide material having a surface and a bulk; and
    functionalized carbon-oxide bound to the surface of the metal oxide material,
    wherein the functionalized carbon-oxide bound to the metal oxide material forms an electrochemically active surface similar to its bulk.

12. The nano-structure electrode of claim 11, wherein the functionalized carbon-oxide is a functionalized carbon-dioxide.

13. The nano-structure electrode of claim 11, wherein the functionalized carbon-oxide has the structure $R-C-O_2$; where R includes one of H, O, an organic structure, and a non-metal element.

14. The nano-structure electrode of claim 13, wherein the functionalized carbon-oxide is bound to a metal on the surface of the metal oxide material and the functionalized carbon-oxide bound to the metal oxide material reduces inactive surface formations during synthesis of the nano-structure.

15. The nano-structure electrode of claim 11, wherein the nano-structure electrode has a crystal size between 5 to 50 nm.

16. The nano-structure electrode of claim 15, wherein the metal oxide material includes Li-ion.

17. The nano-structure electrode of claim 15, wherein the metal oxide material includes $LiMn_2O_4$.

18. The nano-structure electrode of claim 17, wherein the functionalized carbon-oxide is a functionalized carbon-dioxide.

19. The nano-structure electrode of claim 17, wherein the functionalized carbon-oxide has the form $R-C-O_2$; where R includes one of H, O, an organic structure, and a non-metal element.

20. The nano-structure electrode of claim 17, wherein the bound functionalized carbon-oxide increases electrochemically active surface formations during synthesis of the nano-structure.

* * * * *